United States Patent

Maure

[15] 3,656,120

[45] Apr. 11, 1972

[54] READ ONLY MEMORY

[72] Inventor: Douglas R. Maure, Hamden, Conn.

[73] Assignee: Optical Memory Systems Inc., Santa Ana, Calif.

[22] Filed: June 5, 1969

[21] Appl. No.: 830,594

[52] U.S. Cl............340/173 LM, 340/173 LS, 250/220 MX, 250/219 Q, 235/61.11 E, 353/27

[51] Int. Cl.......................................G11c 13/04, G11c 5/04

[58] Field of Search................340/173 LM, 173 LS, 173 SP; 235/61.11 E; 350/160; 353/25, 27; 250/220 MX, 219 Q

[56] References Cited

UNITED STATES PATENTS

| | | | |
|---|---|---|---|
| 2,984,750 | 5/1961 | Herriott | 250/220 |
| 3,036,219 | 5/1962 | Thompson | 250/220 |
| 3,042,912 | 7/1962 | Gilbert | 340/173 X |
| 3,271,758 | 9/1966 | Stultz et al. | 250/219 X |
| 3,439,348 | 4/1969 | Harris et al. | 340/173 X |
| 3,443,068 | 5/1969 | Tucker et al. | 250/219 X |
| 3,479,652 | 11/1969 | Foster | 250/219 X |
| 3,525,856 | 8/1970 | Mengert et al. | 250/220 X |
| 3,215,989 | 11/1965 | Ketchledge | 340/173 LM |
| 3,440,620 | 4/1969 | French | 340/173 LM |

*Primary Examiner*—Stanley M. Urynowicz, Jr.
*Attorney*—Jackson & Jones

[57] ABSTRACT

A read only memory wherein an array of light emitting elements and an array of light sensing elements are positioned on opposite sides of an optical mask is disclosed. The mask is selectively provided with bit value defining light transmissive and non-transmissive portions at the intersection points of the light transmission paths as defined by the arrays and the mask. Individual emitting array and sensing array components are selectively energized and sensed respectively to determine the bit values defined by the mask.

14 Claims, 7 Drawing Figures

PATENTED APR 11 1972 3,656,120

SHEET 1 OF 3

INVENTOR.
DOUGLAS R. MAURE
BY
Jackson & Jones
ATTORNEYS.

READ ONLY MEMORY

BACKGROUND OF THE INVENTION

1. Field of the Invention

The field of this invention includes computer memories and more particularly includes read only memories which utilize an optical mask.

2. Description of the Prior Art

Read only memories or control memories are typically used to control the flow of information in digital computers and to effect conversions from one code to another. As is well-known, high bit densities and fast operating speeds are major criteria in the design of such memories.

Read only memories currently in use are of several general types. One type employs transistors which are connected in accordance with a desired circuit pattern. Transistor read only memories are customarily fabricated from MOS–FET arrays. Transistor systems have the advantage that they are relatively inexpensive to manufacture. Such read only memories, however, are relatively slow, having an operating time (the time to read a given bit value) of approximately 500 nanoseconds. Further, it is extremely difficult to change individual bit values in such memories since changes involve circuit modifications.

A second known type of read only memory utilizes magnetic change cores or thin films which are interwoven with line conductors into a desired memory pattern. Magnetic read only memories, however, are relatively high in cost. Such memories are also relatively slow, having an operating time on the order of 300 nanoseconds. In addition, it is extremely difficult to change the individual bit values in a magnetic read only memory since a change in a given bit value involves modifying the wiring pattern.

Still another form of known read only memory utilizes a memory card having a plurality of holes punched therethrough. A single light source is shined through the holes. The resultant light pattern as determined by detectors located on the side of the card opposite the light source defines the memory pattern. Such optical read only memory, while useful in limited applications where simple codes are involved, are not suitable for applications requiring a moderate or large memory capacity due to the inherent sensor complexity and the physical limitation imposed by the cards.

SUMMARY OF THE INVENTION

In accordance with my invention, an extremely fast, easily changeable, high bit density read only memory is provided wherein each bit value is defined by a light transmitting or a light blocking area on a mask. The mask is read optically, utilizing an array of light emitting elements and an array of light sensing devices positioned on opposite sides of the mask.

Generally described, an array of light emitting elements is positioned on one side of an optical mask. Means are provided for selectively energizing the individual light emitting elements. An array of light sensing devices is positioned on the other side of the mask. Means are provided for determining when each sensing device is receiving light energy. Each emitting element is preferably capable of directing light energy toward all of the sensing devices.

The light transmission paths between each emitting element and all the various sensing elements pass through the optical mask located therebetween. Each location on the mask wherein a transmission path intersects the mask defines a data bit location. At each such bit location, the mask is provided with either a light blocking, for example, an opaque portion, or a light transmitting portion, depending upon the desired bit value. The value of a given data bit is determined by interrogating the sensing device associated with the transmission path passing through the data bit location of interest on the mask. Therefore, for the general case where there are M light emitting elements and N sensing devices, the optical mask is capable of providing a total of MN bit locations.

The value of a given bit location may readily be changed by either applying a dark ink or other suitable non-transmissive material to a bit location or conversely by erasing such non-transmissive materials.

The speed of operation of the read only memory of my invention is limited only by the operating speeds of available photoemissive and photosensitive materials. Since both photoemissive and photosensitive materials capable of operating in approximately a 1 nanosecond range are currently available, the entire read only memory is capable of operating in a 2 nanosecond range. This is approximately 100 times faster than the fastest current transistor or magnetic read only memories available.

DESCRIPTION OF THE PREFERRED EMBODIMENT

Figure 1:
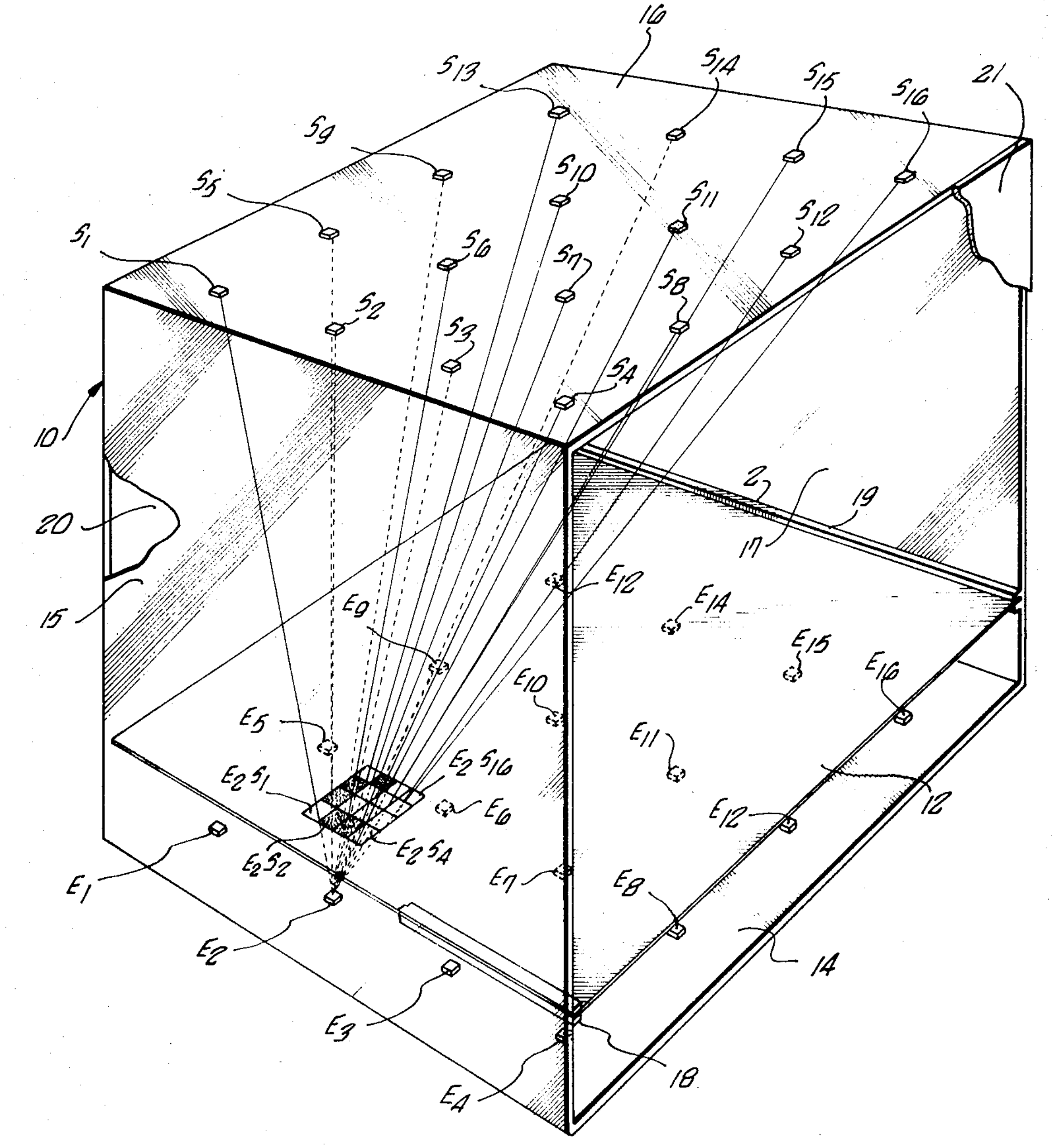
FIG. 1 is a perspective view of a read only memory constructed in accordance with the principles of the present invention.

Turning now to the drawing of FIG. 1, a read only memory 10 comprising a light emitting array $E_1$–$E_{16}$ mounted on the inner surface of mounting member 14, a light sensing array $S_1$–$S_{16}$ mounted on the inner surface of mounting member 16, and an intermediately disposed optical mask indicated at 12, is shown. The exemplary emitter array comprises 16 individual light emitters $E_1$–E 16 which are preferably arranged as shown in a 4 × 4 matrix array. The exemplary sensor array comprises 16 individual light sensors $S_1$–$S_{16}$, which are also preferably arranged in a 4 × 4 matrix array.

Mounting member 16 is held a predetermined distance away from mounting member 14 by support members 15, 17, 20 and 21. The mounting and support members, as shown, form a cubic configuration. The inner surfaces of the cube thus formed are preferably coated with a suitable non-reflecting material to prevent internally reflected light from affecting the operation of the memory. A pair of guides 18 and 19 affixed to the inner surfaces of support members 15 and 17 respectively receive and accurately position mask 12 at a location between the emitter and sensor arrays, as shown, which position is determined in accordance with principles to be hereinafter described.

Each light emitter $E_1$–$E_{16}$ of FIG. 1 preferably directs light energy to each of the light sensors $S_1$–$S_{16}$. Each light emitter of FIG. 1 therefore has a total of 16 significant transmission paths associated therewith, as defined by an emitter and each of the light sensors $S_1$–$S_{16}$. For purposes of clarity, only the 16 significant transmission paths associated with light emitter $E_2$ are illustrated in FIG. 1. The paths associated with each of the remaining light emitters are determined in an identical manner. For the emitter and sensor configuration of FIG. 1, there are, therefore, a total of 16 × 16 or 256 significant transmission paths.

Mask 12 is positioned, in a manner to be hereinafter described, so that the 256 significant transmission paths defined by the emitter and sensor configurations of FIG. 1 intersect mask 12 at 256 discrete intersection points. Each intersection point between a significant light transmission path and the mask 12 defines a data bit location. The value of each such bit location is preset by providing the mask with either a light transmissive or non-transmissive mask portion at the bit location. The value of each bit location is determined by selectively energizing the proper emitter and and interrogating the associated light sensor, in a manner to be hereinafter described, to determine if light energy from the emitter which defines the transmission path of interest is impinging thereon.

The 16 mask bit locations associated with emitter $E_2$ are illustrated in FIG. 1. Each of the 16 bit locations $E_2S_1$–$E_2S_{16}$ is, as shown, defined by the intersection point between a significant light transmission path and the mask 12. The bit values are preset as a function of whether mask 12 is provided with a transmissive or non-transmissive portion at each of the locations $E_2S_1 - E_2S_{16}$.

For example, the bit location $E_2 S_1$ (FIG. 1) is transmissive, which fact may be determined by energizing emitter $E_2$ and interrogating sensor $S_1$. The bit location $E_2S_2$ is non-transmissive, which fact may be determined by energizing emitter $E_2$ and interrogating sensor $E_2$.

The bit locations associated with each of the remaining emitters are determined in the identical manner as described in connection with emitter $E_2$. Clearly the bit locations will in the general case be determinable from a knowledge of the locations of the emitters, the sensors and the position of the mask.

Although the embodiment of FIG. 1 illustrates a 4 × 4 light emitter matrix array and 4 × 4 light sensor matrix array, it is clearly not a requirement to either have the number of sensors equal to the number of emitters or to arrange the emitter and sensor components in a matrix array. As is apparent from the above discussion, any convenient number of mutually displaced emitters and any convenient number of mutually displaced sensors may be arranged in various geometric or non-geometric patterns, the only requirement being that it be possible to physically dispose an optical mask between the emitters and the sensors in such a manner that the mask intersects the light transmission paths from the light emitters to the light sensors.

Figure 3:
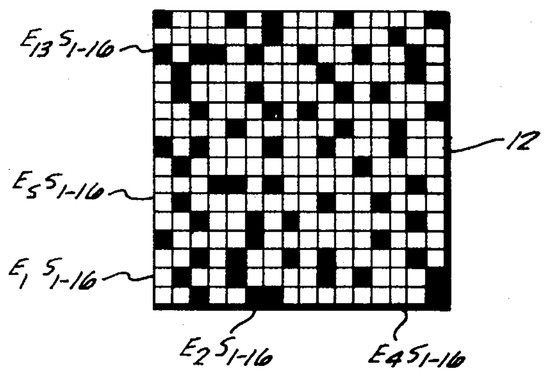
FIG. 3 shows an exemplary optical mask of this invention.

Referring now to FIG. 3, an illustrative mask 12 of FIG. 1 is indicated. As shown in FIG. 3, mask 12 consists of 256 bit locations, the value of each location being defined by whether or not a location is darkened, indicating that it is a non-transmissive location, or is undarkened, indicating that it will transmit light.

The mask of FIG. 3 is intended to be only illustrative of the concept involved. It is clear, for example, that the 256 individual bit locations $E_1S_1$–15 to $E_{16}S_1$–15 would not in general be geometrically disposed as indicated in FIG. 3, but rather would be disposed as a function of the transmission paths as defined by the emitter and sensor configurations, as shown, for example, by those associated with emitter $E_2$ in FIG. 1.

The mask 12 may be fabricated in a manner well-known to those knowledgeable in the concerned art. For example, a photographic plate may be utilized with the light and dark areas being applied by standard photographic techniques. Alternately, an etching process may be utilized in which the mask is fabricated by selectively etching away opaque areas on a plate.

Figure 4:
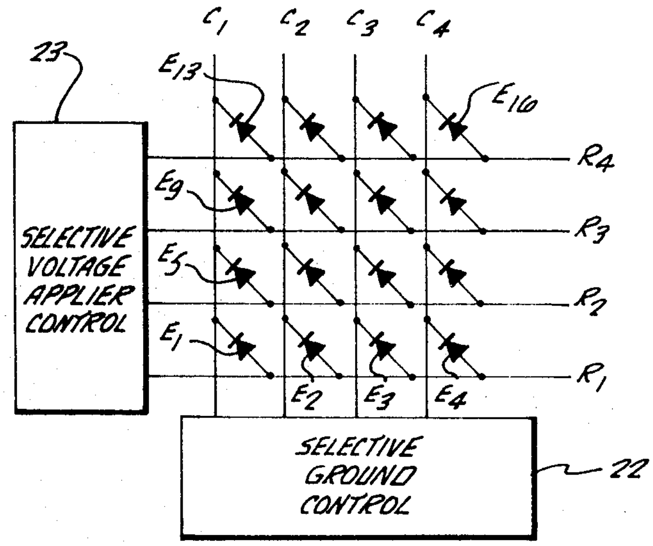
FIG. 4 is a block diagram and circuit schematic of an exemplary emitter array configuration constructed in accordance with the principles of the present invention.

Referring now to FIG. 4, one suitable light emitter matrix array, including emitters $E_1$–$E_{16}$ of FIG. 1 is shown. The emitters are arranged and adapted to be selectively energized in accordance with standard matrix principles. The emitters $E_1$–$E_{16}$ may preferably be photoemissive diodes fabricated from a photoemissive material such as galium arsenide or galium phosphide. Galium arsenide diodes are particularly suited for rapid response systems since such diodes emit light within one nanosecond of the application of a voltage thereto. The nature of the emitting source chosen will, of course, depend upon the particular system requirements.

Shown in FIG. 4 is a standard matrix energization circuit suitable for use in the device of FIG. 1 wherein the emitter diodes $E_1$–$E_{16}$ are connected across column wires $C_1$–$C_4$ and row wires $R_1$–$R_4$ which are selectively grounded and energized respectively in accordance with standard matrix techniques to selectively energize a desired emitter. For example, to energize photoemissive diode $E_5$, selective ground control 22 grounds column wire $C_1$ and selective voltage applier 23 applies an energization voltage to row wire $R_2$.

Figure 5:
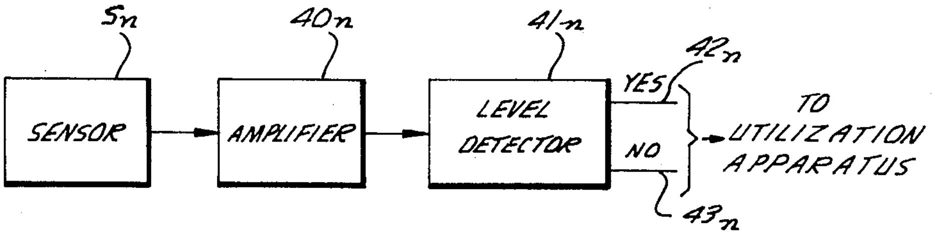
FIG. 5 is a block diagram of a typical individual sensor circuit constructed in accordance with the principles of the present invention.

Referring now to FIG. 5, a typical sensing circuit capable of detecting the output of a photosensitive device $S_n$ is illustrated. Photosensitive devices are generally of two types: those which emit a current upon receipt of electromagnetic energy and those which exhibit a change in a measurable electrical characteristic such as resistance. The configuration of FIG. 5 is suited to detect the receipt of light energy by a sensor of the former type. Silicon and germanium pin diodes are particularly well suited since they emit a detectable current within one nanosecond of receipt of electromagnetic energy. The output from the sensor $S_n$, FIG. 5, is amplified by an amplifier $40_n$. The output from amplifier $40_n$ is applied to a level detector $41_n$. Level detector $41_n$ provides one of two outputs depending upon whether the signal received from amplifier $40_n$ is above or below a preselected level. Level detector $41_n$ allows differentiation between receipt of a true signal representative of receipt of electromagnetic energy from an emitter and extraneous receipt of light energy resulting from, for example, ambient light conditions. In a preferred form of the invention, each of the individual sensors $S_1$–$S_{16}$ of FIG. 1 are provided with an associated sensing circuit as in FIG. 5. The output of each of the associated level detectors ($41_1$ to $41_{16}$) would be connected to standard utilization apparatus (not shown).

Sensor devices of the second kind, such as MOS–FET transistors which exhibit a change in resistive value upon receipt of electromagnetic energy, may also be used with suitable well-known detection circuitry, not shown, adapted to detect a change in resistance.

Figure 6:
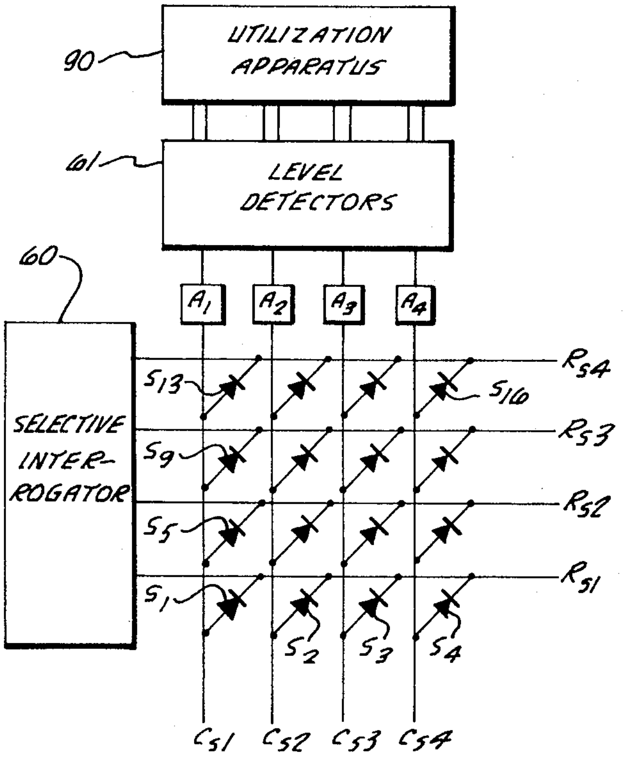
FIG. 6 is a block diagram and circuit schematic of an exemplary sensor array configuration constructed in accordance with the principles of the present invention.

Referring now to FIG. 6, there is shown an alternate sensing circuit of matrix configuration for selectively interrogating the individual sensing components of the sensing array $S_1$–$S_{16}$ of FIG. 1. It is assumed that the sensing devices $S_1$–$S_{16}$ are photodiodes of the kind which emit a current upon receipt of electromagnetic energy.

The photodiodes $S_1$–$S_{16}$ are connected, as shown, across row conductors $R_{s1}$–$R_{s4}$ and column conductors $C_{s1}$–$C_{s4}$ as shown. Each column conductor has an amplifier $A_1$–$A_4$ associated therewith. The outputs from amplifiers $A_1$–$A_4$ are applied to associated level detectors in level detector circuit 61. The outputs from level detectors 61 are applied to standard utilization apparatus 90. In operation the row conductors $R_{s1}$–$R_{s4}$ are selectively grounded by selective interrogator 60, thus completing the interrogating circuit for a row of sensors. The output from the level detectors associated with the column conductors $C_{s1}$–$C_{s4}$ will determine which sensors have light energy impinging thereon.

The matrix configured sensing circuit requires fewer amplifiers and level detectors than the sensing scheme of FIG. 5. There is a sacrifice in overall operating speed, however, since the sensing array $S_1$–$S_{16}$ may be interrogated only one row at a time, whereas for the case where each sensor has an associated amplifier and level detector, the entire array may be interrogated at the same instant.

Figure 7:
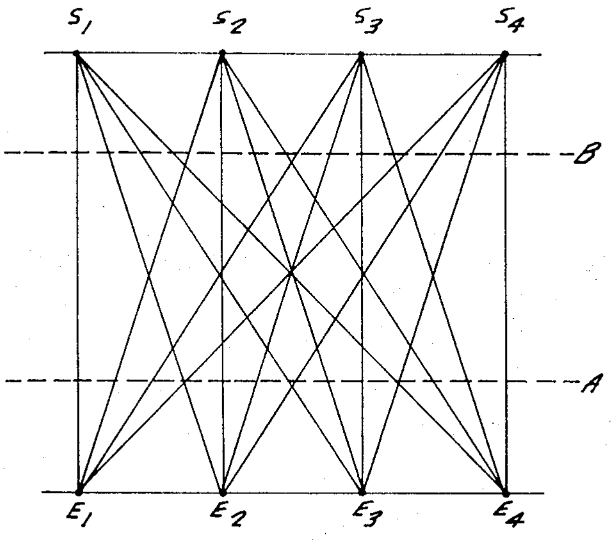
FIG. 7 depicts a portion of the emitter and sensor arrays of FIG. 1 and is useful in promoting an understanding of the criteria involved in positioning the optical mask.

Referring now to FIG. 7, there is shown one column of sensors comprising sensors $S_1$–$S_4$ and one column of emitters comprising emitters $E_1$–$E_4$ of FIG. 1. Also shown are the total number of light transmission paths interconnecting the above-described emitters and sensors. FIG. 7 is useful in understanding the criteria which must be satisfied when locating the mask between the emitters and sensors. It is first again noted that the bit positions on the mask are defined by the points of intersection between the mask surface and the transmission path from the emitters to the sensors.

In order to assure that each bit location defines only one transmissive path, that is, one path from an emitter to a sensor, it is necessary to assure that only one transmissive path intersects the mask surface at each bit location. As can be seen in FIG. 7 the area between Plane A and Plane B contains transmissive path intersection points or points wherein two or more of the light transmission paths intersect. A mask positioned to pass through such an intersection point clearly would be unable to provide distinct bit values for each path. Stated in other words, the mask at a point of intersection must either be light transmissive or non-transmissive. If it is transmissive for one of the intersecting paths at a point of intersection, it must be transmissive for the other and vice versa. Therefore, in order to assure that each bit location is exclusive for one emitter-sensor pair the mask is preferably placed either above or below the total number of transmission path intersection points. Referring to FIG. 7, the mask would preferably be placed in the area either between line A and the emitters $E_1$–$E_4$ or between line B and the sensors $S_1$–$S_4$.

Figure 2:
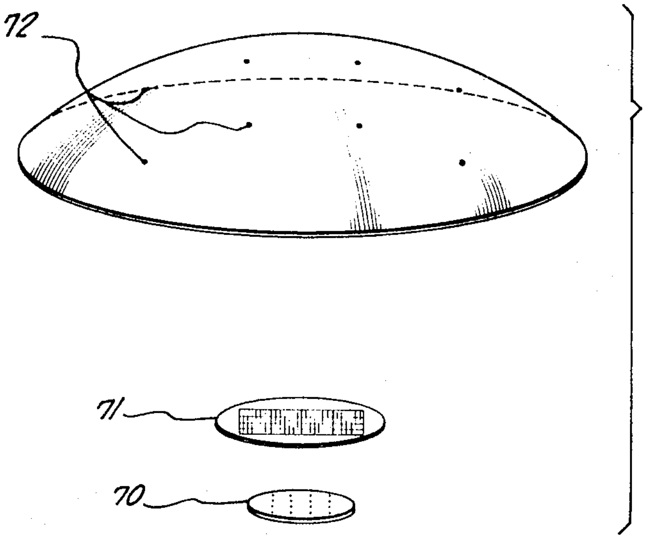
FIG. 2 is a perspective view of a second embodiment of a read only memory constructed in accordance with the principles of the present invention.

Referring now to FIG. 2, there is shown a second embodiment of a read only memory constructed in accordance with the principles of the instant invention. Shown in FIG. 2 is a light emitter array generally designated at 70. The emitter array 70 is designed to have the individual emitters (represented by position dots) close together in relation to the sensor array 72. The sensor array 72 is positioned on a sphere portion having the emitter array 70 substantially located at the sphere center. A mask 71 constructed in accordance with the principles previously described is interposed between emitter array 70 and the sensor array generally designated at 72. The embodiment of FIG. 2 is adapted to assure that the various light transmissive paths are of approximately the same length, thus assuring that the sensors receive a signal of approximately the same strength from each emitter.

Although two embodiments of the present invention have been described, it will be apparent to those skilled in the art that many others may be constructed. In addition, for any given emitter and sensor configuration a plurality of interchangeable masks may be used, each mask defining a different memory pattern. For example, mask 12 of FIG. 1 may be removed and another mask inserted using guides 18 and 19 as the positioning means. In this manner any number of additional masks may be selectively utilized without requiring additional circuitry. Since emitters are currently available with a response time of less than 1 nanosecond, and sensors are also available with a similar response time, my invention is capable of providing a read only memory system having a response time of less than 2 nanoseconds.

What is claimed is:

1. In an optical memory system the combination which comprises:

an optical storage mask divided into *m* portions, each portion defining *n* discrete areas with each area being substantially opaque or transparent to represent binary digits;

*n* spaced independent light sensors, each sensor corresponding to a separate area in each of the *m* portions of the mask and being arranged to produce an output signal when illuminated with light so that the output signals from one or more sensors may be simultaneously detected;

means for illuminating each of the *m* portions of the mask with only one portion being illuminated at a time and transmitting the beams of light passing through each corresponding transparent area of each *m* portion to a common point on a respective sensor; and means responsive to the output signals of one or more selected sensors to determine the binary value represented at selected areas of the mask.

2. The combination as defined in claim 1 wherein the means for illuminating the mask comprises m spaced emitters, each emitter arranged to emit light when energized, each emitter being positioned between the respective m portions of the mask and the sensors.

3. The combination as defined in claim 1 wherein each of the emitters is a photoemissive diode and each of the sensors is a photosensitive diode.

4. A read only memory comprising;

an optical mask;

a plurality of spaced light emitters for emitting light when energized;

a plurality of spaced independent light sensors for providing output signals when illuminated with light so that the output signals from one or more sensors may be simultaneously detected, said light emitters and sensors defining a plurality of light transmission paths equal in number to the number of emitters multiplied by the number of sensors: each emitter when illuminated one at a time transmitting a plurality of light beams to said mask equal to the number of sensors, the light beams associated with every illuminated emitter having a common termination point at each of the sensors irrespective of which emitter is illuminated;

said optical mask disposed between the emitters and the sensors so as to intersect each transmission path at a separate point on the mask, the mask defining a discrete area representing a binary bit value at each intersection point, with each area being either substantially opaque or transparent to said light beams in the transmission paths;

means for selectively energizing the emitters; and means responsive to the output signals of one or more selected sensors to determine the binary value represented at selected sensors to determine the binary bit value represented at selected intersection points.

5. An optical device in accordance with claim 4 wherein said plurality of light sensors has a predetermined pattern, and wherein said mask portion has opaque or transmitting areas thereof formed in the same pattern as said pattern of said sensors at points of intersection of said light beams with said mask.

6. The combination of claim 4 wherein each sensor generates a voltage output responsive to receiving electromagnetic energy and wherein said last named means comprises:

an amplifier receiving the output of an associated sensor for amplifying the output signal; and a level detector receiving the output of said amplifier for providing one of two outputs as a function of whether said amplifier output is above or below a preselected level.

7. The combination as defined in claim 4 wherein the mask is positioned between the sensors and the area wherein the light paths from the several emitters intersect.

8. An optical device in accordance with claim 4 wherein said plurality of mutually spaced emitters are located in a first relatively small area approximately defining the center position of a sphere and wherein said plurality of sensors are located on a portion of the spherical surface whereby the transmission paths are all of approximately the same length.

9. The combination of claim 4 wherein said emitters and said sensors are arranged respectively in row and column matrix arrays.

10. The combination of claim 4 wherein said plurality of mutually spaced emitters are located in a first relatively small area approximately defining the center position of a sphere and wherein said plurality of sensors are located on a portion of the spherical surface whereby the transmission paths are all of approximately the same length.

11. The combination of claim 4 further comprising:

mounting means receiving said mask for accurately positioning said mask at a predetermined location between said emitters and said sensors.

12. The combination of claim 11 wherein said mask is in the form of a substantially flat plate and wherein said mounting means comprises:

a pair of guides adapted to engage opposite ends of said mask in a manner allowing said mask to be slideably moved into and out of engagement with said guides.

13. The combination as defined in claim 4 wherein the mask is positioned between the emitter and the area wherein the light paths from the several emitters intersect.

14. The combination as defined in claim 13 wherein each of the emitters is a photoemissive diode and each of the sensors is a photosensitive diode.

MISSING PAGE TEMPORARY NOTICE

PATENT # 3656120 FOR ISSUE DATE 4-11-72

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # 7 to end